(12) United States Patent  
Yoshikawa

(10) Patent No.: US 7,515,177 B2  
(45) Date of Patent: Apr. 7, 2009

(54) IMAGING DEVICE

(75) Inventor: Koichi Yoshikawa, Kanagawa (JP)

(73) Assignee: Sony Corporation (JP)

( * ) Notice: Subject to any disclaimer, the term of this patent is extended or adjusted under 35 U.S.C. 154(b) by 632 days.

(21) Appl. No.: 10/537,344

(22) PCT Filed: Dec. 2, 2003

(86) PCT No.: PCT/JP03/15421

§ 371 (c)(1),  
(2), (4) Date: Jun. 3, 2005

(87) PCT Pub. No.: WO2004/051365

PCT Pub. Date: Jun. 17, 2004

(65) Prior Publication Data

US 2006/0114332 A1 Jun. 1, 2006

(30) Foreign Application Priority Data

Dec. 5, 2002 (JP) ............................. 2002-353994

(51) Int. Cl.  
*H04N 5/225* (2006.01)

(52) U.S. Cl. .................. 348/218.1; 348/335; 348/36

(58) Field of Classification Search ............ 348/218.1, 348/340–344, 335, 36–39; 396/322, 326, 396/327

See application file for complete search history.

(56) References Cited

U.S. PATENT DOCUMENTS 3,118,340 A 1/1964 Iwerks 5,657,073 A * 8/1997 Henley .................. 348/38

(Continued)

FOREIGN PATENT DOCUMENTS

JP 39-8140 5/1964

(Continued)

OTHER PUBLICATIONS

International Search Report mailed Jan. 20, 2004.

(Continued)

*Primary Examiner*—Tuan V Ho  
(74) *Attorney, Agent, or Firm*—Rader Fishman & Grauer PLLC; Ronald P. Kananen

(57) ABSTRACT

An image pickup apparatus is able to shoot an image of a wide range by a plurality of image pickup units, it is able to obtain excellent image quality and it can be miniaturized. An image pickup apparatus 20 comprises a plurality of image pickup units 1 including an image pickup device 3 and a front lens 2, the adjacent image pickup units 1 being located in such a manner that image pickup areas overlap each other and the image pickup units being located so as to satisfy a conditional equation AL<fD (1) where a cross-section passing a viewpoint center, an image pickup device 3 and a front lens 2 is created in the direction in which the image areas of the adjacent image pickup portions overlap with each other, a cross-section length of the image pickup device 3 is assumed to be A, a cross-section length of the front lens 2 is assumed to be D, a length from the front lens 2 to the image pickup device 3 is assumed to be L and a focal length which results from synthesizing the whole of the lenses within the image pickup unit 1 containing the front lens 2 is assumed to be f and that the viewpoint center of each image pickup unit 1 may lie within a sphere with a diameter of 20 mm.

3 Claims, 3 Drawing Sheets

U.S. PATENT DOCUMENTS

2004/0100443 A1* 5/2004 Mandelbaum et al. ...... 345/158
2006/0125921 A1* 6/2006 Foote .......................... 348/159

FOREIGN PATENT DOCUMENTS

| | | |
|---|---|---|
| JP | 04-097334 | 3/1992 |
| JP | 07-067020 | 3/1995 |
| JP | 8-307735 | 11/1996 |
| JP | 10-145657 | 5/1998 |
| JP | 11-122521 | 4/1999 |
| JP | 2001-203924 | 7/2001 |
| JP | 2002-229138 | 8/2002 |
| JP | 2002-314867 A | 10/2002 |
| JP | 2002-320124 A | 10/2002 |
| JP | 2003-162018 A | 6/2003 |

OTHER PUBLICATIONS

Japanese Office Action issued Dec. 16, 2008 for corresponding Japanese Application No. 2002-353994.

* cited by examiner

IMAGING DEVICE

TECHNICAL FIELD

The present invention relates to an image pickup apparatus composed of a plurality of image pickup units including a lens and an image pickup device.

BACKGROUND ART

A large number of image pickup apparatus capable of shooting a picture of a wide angle of view by using a plurality of cameras have been proposed so far.

For example, there has been proposed an image pickup apparatus in which a plurality of cameras is mounted on a polyhedron frame (see cited patent reference 1, for example).

However, according to this arrangement, since viewpoint centers of the respective cameras are not coincident with each other, parallax (parallax) is produced between the cameras so that a plurality of images cannot be joined with high quality. Also, when it is intended to take a picture of an object near (within the shortest range) the camera, it is unavoidable that the dead angle at which the camera is unable to take a picture is produced.

On the other hand, there has been proposed an image pickup apparatus in which viewpoint centers of a plurality of cameras can be made substantially coincident with each other imaginarily by a pyramidal mirror (see cited patent references 2 and 3, for example)

Cited Patent Reference 1: Official Gazette of Japanese laid-open patent application No. 2001-203924 (FIG. 5)

Cited Patent Reference 2: Official Gazette of Japanese published patent application No. 39-8140 (FIG. 1)

Cited Patent Reference 3: Official Gazette of Japanese laid-open patent application No. 8-307735 (FIG. 1)

In the arrangement using the pyramidal mirror, since the viewpoint centers of a plurality of cameras are optically coincident with each other, those problems of the parallax and the dead angle relative to the object within the shortest range do not arise.

However, since the above-mentioned arrangement needs the pyramidal mirror, problems arise in which the whole of an image pickup apparatus becomes large in size and in which the mirror must be prevented from being cracked or smudged, causing it to be difficult to handle the pyramidal mirror.

Further, since it is not possible to take a picture in the direction along the central axis of the pyramid (in the upper and lower direction in the ordinary location of the pyramidal mirror) due to the structure of the pyramidal mirror, it is difficult to take pictures in all directions.

In order to solve the above-mentioned problem, it is an object of the present invention to provide an image pickup apparatus capable of shooting a picture in a wide range by a plurality of image pickup units which can obtain excellent image quality and which can be miniaturized.

DISCLOSURE OF THE INVENTION

An image pickup apparatus according to the present invention comprising a plurality of image pickup units including an image pickup device and a front lens, the adjacent image pickup units being located in such a manner that image pickup areas of the image pickup units may overlap each other, is characterized in that the image pickup units are located in such a manner that a conditional equation:

$$AL < fD \quad (1)$$

is satisfied where a point at which a principal ray at the end of an angle of view is extended to cross an optical axis at each image pickup unit is defined as a viewpoint center, a cross-section passing the viewpoint center, the image pickup device and the front lens is created in the direction in which the adjacent image pickup units and the image pickup areas overlap each other, a cross-section length of the image pickup device is assumed to be A in the cross-section, a cross-section length of the front lens is assumed to be D, a length from the front lens to the image pickup device is assumed to be L and a focal length which results from synthesizing the whole of lenses within the image pickup unit containing the front lens is assumed to be f; and that the viewpoint centers of a plurality of image pickup units lie within a sphere with a diameter of 20 mm.

Also, in the above-mentioned image pickup apparatus, the adjacent image pickup units and the image pickup areas overlap each other in a plurality of directions and the image pickup units satisfy the conditional equation (1) in all of a plurality of directions.

According to the above-mentioned arrangement of the image pickup apparatus of the present invention, when a point at which a principal ray at the end of an angle of view is extended to cross an optical axis at each image pickup unit is defined as a viewpoint center, a cross-section passing the viewpoint center, the image pickup device and the front lens is created in the direction in which the adjacent image pickup units and the image pickup areas overlap each other, a cross-section length of the image pickup device is assumed to be A in the cross-section, a cross-section length of the front lens is assumed to be D, a length from the front lens to the image pickup device is assumed to be L and a focal length which results from synthesizing the whole of lenses within the image pickup unit containing the front lens is assumed to be f, the conditional equation AL<fD is satisfied.

At that time, an angle of view of lens W and a visual angle θ from the image pickup device to the lens in the direction in which the adjacent image pickup units and the image pickup areas overlap each other are expressed by the following equations (2) and (3):

$$W = 2 \tan^{-1}(A/(2f)) \quad (2)$$

$$\theta = 2 \tan^{-1}(D/(2L)) \quad (3).$$

Then, since an inequality of AL<fD of the conditional equation (I) is satisfied, an inequality of $0 < A/(2f) < D/(2L)$ is established and a function $f(x) = 2 \tan^{-1} x$ is monotonically increased with respect to x. Thus, an inequality of W<θ is satisfied.

As a result, since the visual angle θ from the image pickup device to the lens is larger than the angle of view of lens W, the viewpoint center is located behind the image pickup device. Thus, it becomes possible to make other image pickup units and the viewpoint centers become substantially coincident with each other.

Then, since the image pickup units are located in such a manner that the respective viewpoint centers of a plurality of image pickup units may lie within the sphere with the diameter of 20 mm, it becomes possible to overlap images obtained from these image pickup units with each other without causing parallax.

Also, in the above-described image pickup apparatus, when the adjacent image pickup units and the image pickup areas overlap each other in a plurality of directions and the image pickup units satisfy the conditional equation (1) in all of a plurality of directions, it becomes possible to overlap images with each other without causing parallax.

BEST MODE FOR CARRYING OUT THE INVENTION

Figure 1:
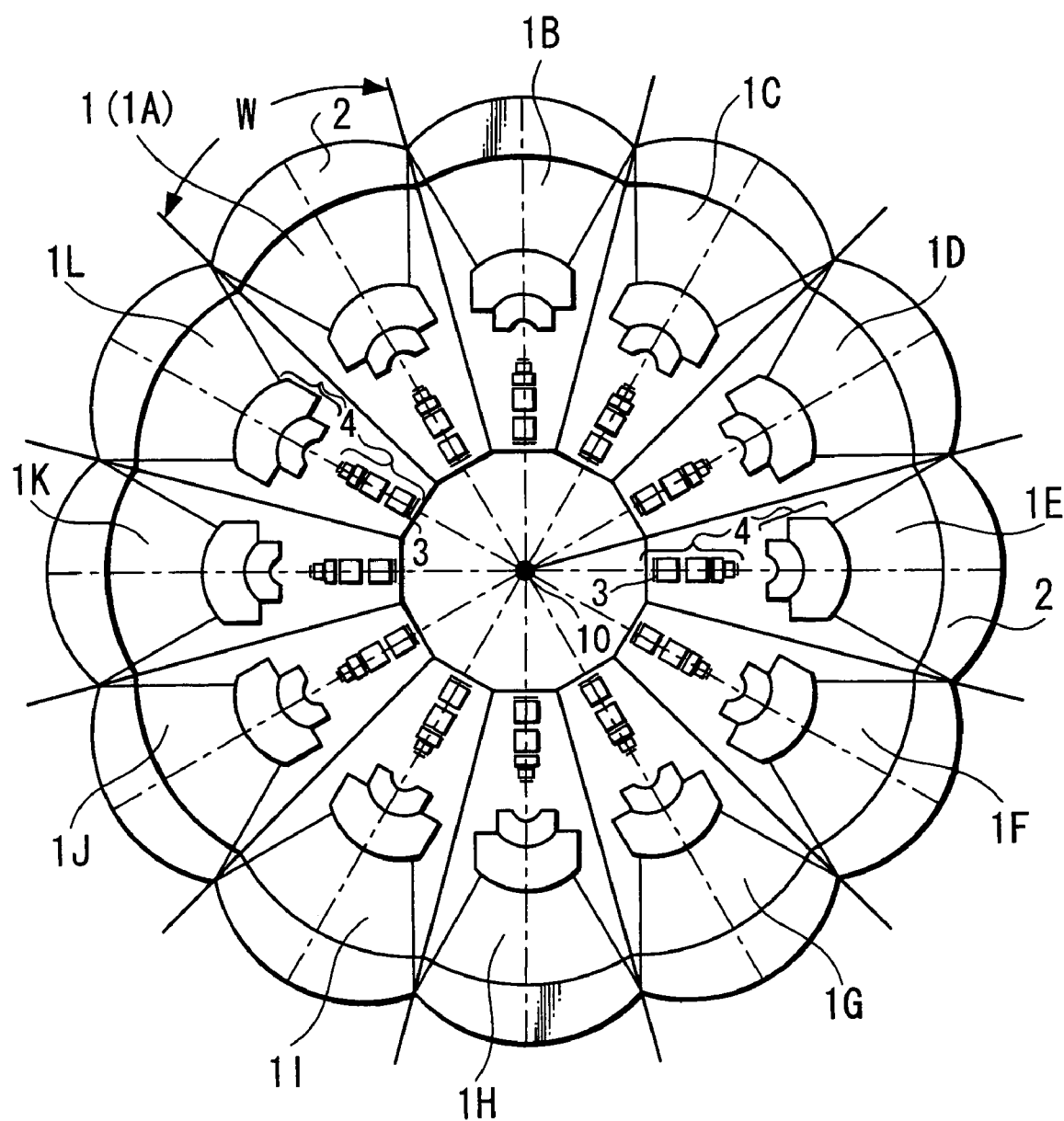
FIG. 1 is a schematic construction diagram (cross-sectional view along the horizontal direction) of an image pickup apparatus according to an embodiment of the present invention.

FIG. 1 is a schematic construction diagram (cross-sectional view along the horizontal direction) showing an image pickup apparatus according to an embodiment of the present invention.

This image pickup apparatus 20 is constructed in such a manner that 12 (1A, 1B, 1C, 1D, 1E, 1F, 1G, 1H, 1I, 1J, 1K, 1L) image pickup units (cameras) 1 including a front lens 2 and an image pickup device 3 are located in a radial fashion and that the adjacent image pickup units 1 are joined together.

In each image pickup unit 1, the front lens 2 is located at its front end and the image pickup device 3 is located near its rear end. Each image pickup unit includes a lens group 4 between the front lens 2 and the image pickup device 3.

According to this arrangement, the respective image pickup units 1A to 1L share image pickup areas of 30 degrees each to provide an image pickup area of 360 degrees in total.

In order that images obtained from the adjacent image pickup units 1 may overlap each other and in order that a mechanical error may be absorbed, it is preferable that the angle of view W in the horizontal direction of each image pickup unit 1 should be selected to be slightly larger than 30 degrees so that the image pickup areas of the adjacent image pickup units 1 may overlap each other.

Further, although not shown, the image pickup areas of the respective image pickup units 1A to 1L have angles of view of 30 degrees each and hence the image pickup apparatus 20 is able to shoot a cylindrical panoramic image on the whole.

The viewpoint centers of the respective image pickup units (cameras) 1 are substantially coincident with each other at a central point 10 of the image pickup apparatus 20. In each image pickup unit 1, the viewpoint center is defined as a point at which a principal ray at the end of the angle of view is extended to cross the optical axis.

Figure 2:
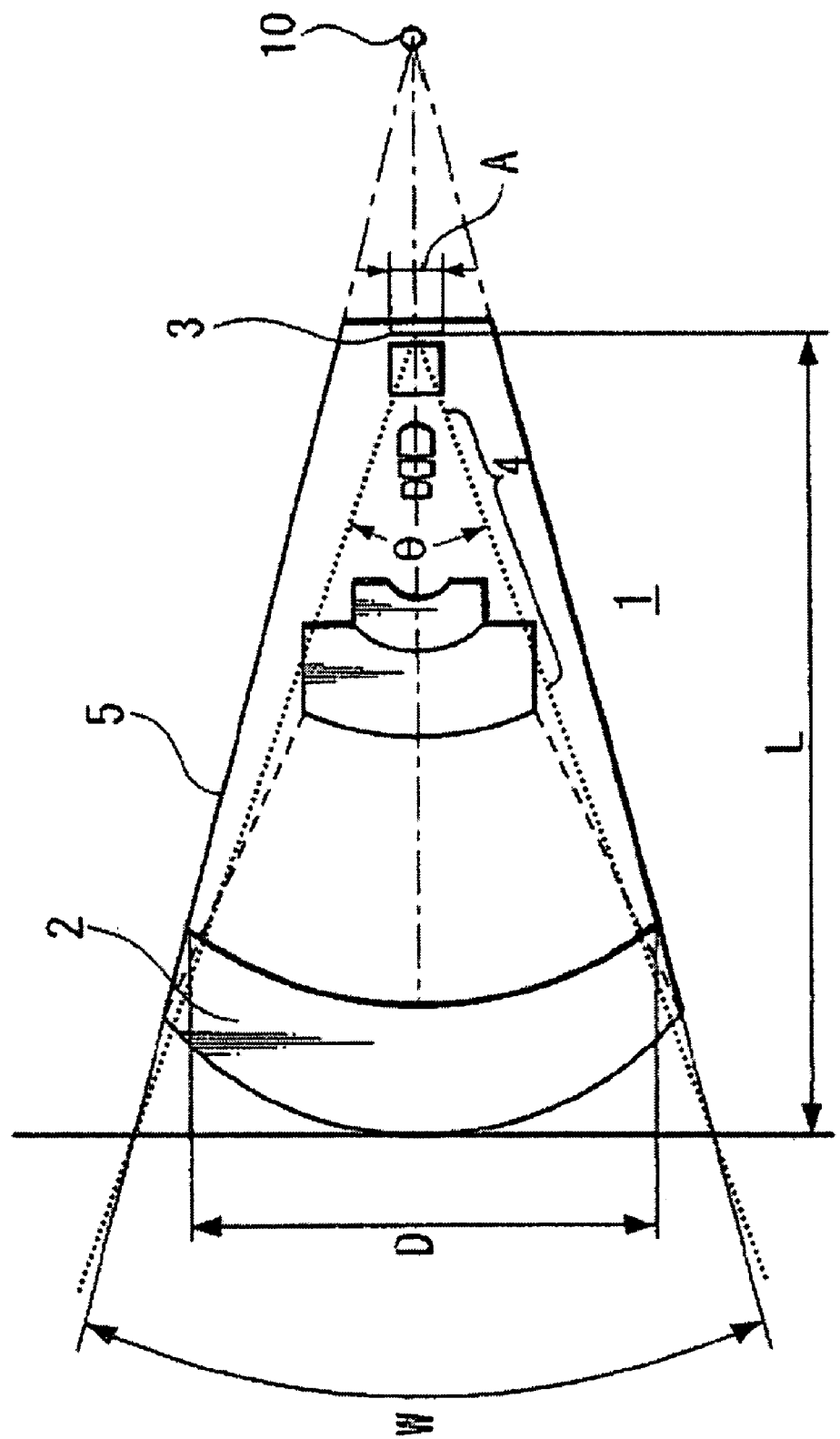
FIG. 2 is a cross-sectional view of one image pickup unit of the image pickup apparatus shown in FIG. 1.

Next, FIG. 2 is a cross-sectional view showing one image pickup unit (camera) 1 of the image pickup apparatus 20 in detail.

The outsides of the respective assemblies (front lens 2, lens group 4 and image pickup device 3) of the image pickup unit 1 are covered with a camera lens-barrel 5, and this camera lens-barrel 5 is formed so as to extend along rays at substantially the end of the angle of view.

The image pickup device 3 is shaped like a flat surface of a square shape although not shown.

The image pickup apparatus 20 according to this embodiment may have an arrangement in which the respective image pickup units 1 (1A to 1L), in particular, can satisfy the aforementioned conditional equation (1). That is, in the horizontal direction in which the image pickup areas of the adjacent image pickup units 1 may overlap each other, an inequality of AL<fD in the conditional equation (1) should be satisfied where:

A: cross-section length of horizontal direction of image pickup device 3 (=length of one side)

f: focal length of lens (whole focal length of front lens 2 and lens group 4)

D: cross-section length of horizontal direction of front lens 2

L: length from front lens 2 to image pickup device 3.

In this embodiment, since the image pickup device 3 is shaped like the flat surface of the square shape, it is customary that the image pickup device 3 is located in such a manner that the respective sides of the square may become corresponding to the horizontal directions and the upper and lower directions. Thus, the cross-section length of the horizontal direction of the image pickup device 3 coincides with the length of one side of the image pickup device 3. If the image pickup device is located in such a manner that the diagonal lines of the square may become corresponding to the horizontal direction and the upper and lower direction, then the cross-section length of the horizontal direction of the image pickup device 3 coincides with the length of the diagonal line of the image pickup device 3.

As a result, with respect to the angle of view of lens W and the visual angle θ from the image pickup device 3 to the front lens 2, the inequality of W<θ is established based on the conditional equation (1) and the following equations (2) and (3):

$$W = 2\tan^{-1}(A/(2f)) \quad (2)$$

$$\theta = 2\tan^{-1}(D/(2L)) \quad (3).$$

As described above, since the visual angle θ from the image pickup device 3 to the front lens 2 is larger than the angle of view of lens W, the viewpoint center is located behind the image pickup device 3. Thus, it becomes possible to make the viewpoint centers of the respective image pickup units 1 (1A to 1L) become nearly coincident with one point 10 shown in FIG. 1.

The following design conditions of the image pickup apparatus 20 according to this embodiment are possible, in which the length A of one side of the image pickup device 3 is equal to 3.6 mm, the diameter D of the front lens 2 is equal to 38.6 mm, the length L from the front lens 2 to the image pickup device 3 is equal to 58.7 mm and the focal length f of the lens is equal to 6.5 mm.

At that time, since AL=3.6×58.7=211.32 and fD=6.5×38.6=250.9, the inequality of AL<fD is established and hence the conditional equation (1) can be satisfied.

Then, since W=2×tan$^{-1}$(3.6/2/6.5)=30.96 and θ=2×tan$^{-1}$(38.6/2/58.7)=36.4 are established from the equations (2) and (3), an inequality of W<θ is established and it is to be understood that the viewpoint center is located behind the image pickup device 3.

On the other hand, as a comparative arrangement, let us consider the case which cannot satisfy the conditional equation (1).

If the length A of one side of the image pickup device 3 is equal to 3.6 mm, the diameter D of the front lens 2 is equal to 30 mm, the length L from the front lens 2 to the image pickup device 3 is equal to 58.7 mm and the focal length f of the lens is equal to 6.5 mm, that is, the diameter D of the front lens 2 is reduced to 30 mm, then AL=211.32 and fD=6.5×30=195. Thus, an inequality of AL>fD is established and hence the conditional equation (1) cannot be satisfied.

In this case, since W=2×tan$^{-1}$(3.6/2/6.5)=30.96 and θ=2×tan$^{-1}$(30/2/58.7)=28.7 are established from the equations (2) and (3), an inequality of θ<W is established. Also, since the length P from the front lens to the viewpoint center=D/2/tan(W/2)=54.2 mm is established, an inequality of P<L is established.

Accordingly, since the inequalities of θ<W and P<L are established, the viewpoint center is located within the lens lens-barrel so that it becomes difficult to make the viewpoint centers of a plurality of image pickup units become close to each other.

According to the above-mentioned arrangement of the image pickup apparatus 20 of this embodiment, since the respective image pickup units 1 can satisfy the conditional equation (1), the viewpoint center can be located behind the image pickup device.

As a consequence, without using a mirror, the respective viewpoint centers of a plurality of image pickup units (cameras) 1 (1A to 1L) can be located so as to lie within the sphere with the diameter of 20 mm, more preferably, the respective viewpoint centers can be substantially made coincident with each other.

As described above, since the viewpoint centers are located so as to lie within the sphere with the diameter of 20 mm or they are made substantially coincident with each other, no parallax occurs so that images at the joints need not be processed when images shot by the respective image pickup units 1 are joined.

As a consequence, image quality can be maintained to be high and a processing time for joining images can be omitted or reduced.

Accordingly, processing for overlapping images can be executed in a real-time fashion and it is possible to apply the present invention to a live broadcast and the like with ease.

Then, since the image pickup apparatus 20 according to this embodiment does not use a mirror, a cameraman is not troubled by a mirror which is difficult to handle and hence the image pickup apparatus according to the present invention can be made easy to handle similarly to the ordinary lens. In addition, as compared with the case in which the image pickup apparatus uses a mirror, the image pickup apparatus 20 can be miniaturized.

Also, when a cameraman intends to take a picture of an object in the shortest range from the image pickup apparatus 20 according to this embodiment, the dead angle is not produced and hence the image pickup apparatus according to the present invention can take pictures of any objects.

Further, when the image pickup apparatus 20 according to this embodiment is compared with other arrangements of an image pickup apparatus for taking pictures in all directions, for example, an arrangement using a fisheye lens and a single camera or an arrangement using a curved surface mirror and a single camera, it is possible to maintain much more picture elements, since the image pickup areas can be overlapped with each other by using a plurality of image pickup units 1 (1A to 1L).

Since much more picture elements can be maintained as described above, it becomes possible to improve resolution and also it becomes possible to improve image quality.

Also, since the image pickup area of one image pickup unit 1 is narrowed and a range in which lenses (front lens 2 and lens group 4) for use with the image pickup unit 1 are selected can be widened so that it becomes possible to use a lens having high optical performance, it becomes possible to obtain sufficient resolution and image quality by maintaining, in particular, resolution near the joint of the image pickup areas of the respective image pickup units 1.

Accordingly, it is possible to shoot pictures of high image quality in the whole circumference of the belt-like area.

While the viewpoint centers of the respective image pickup units 1 are made substantially coincident with one point 10 in the above-mentioned embodiment, a slight difference can be allowed insofar as such slight difference does not bother the connection of the images and the present invention is not limited to the arrangement in which the viewpoint centers are made substantially coincident with one point.

Then, in order to prevent the joint of the images from being disturbed, it is desired that the viewpoint centers of the respective image pickup units 1 should be located so as to lie within the sphere with the diameter of 20 mm.

Also, while the optical assemblies (front lens 2, lens group 4 and image pickup device 3) of the respective image pickup units 1 have the same arrangement and the respective image pickup units 1 have the same arrangement shown in FIG. 2 in the above-mentioned embodiment, even when the arrangements of the respective image pickup units 1 are different from each other, if the respective arrangements of the image pickup units can satisfy the conditional equation (1), then, since the viewpoint center can be located behind the image pickup device, the viewpoint centers can be located within the sphere with the diameter of 20 mm so that the images can be joined without trouble.

While the image pickup apparatus 20 according to this embodiment includes 12 cameras (image pickup units) 1 arrayed in one row so that the belt-like range of 360 degrees in the horizontal direction and the belt-like range of 30 degrees in the vertical direction can be provided as image pickup areas, in order to widen the shooting range in the vertical direction, it is sufficient that a plurality of camera rows in which cameras (image pickup units) are arrayed in a belt-like fashion in the horizontal direction may be accumulated in the vertical direction, for example.

As a result, it becomes possible to shoot images of every direction (all directions) containing the upper and lower direction.

An embodiment of this case will be described next.

Figure 3:
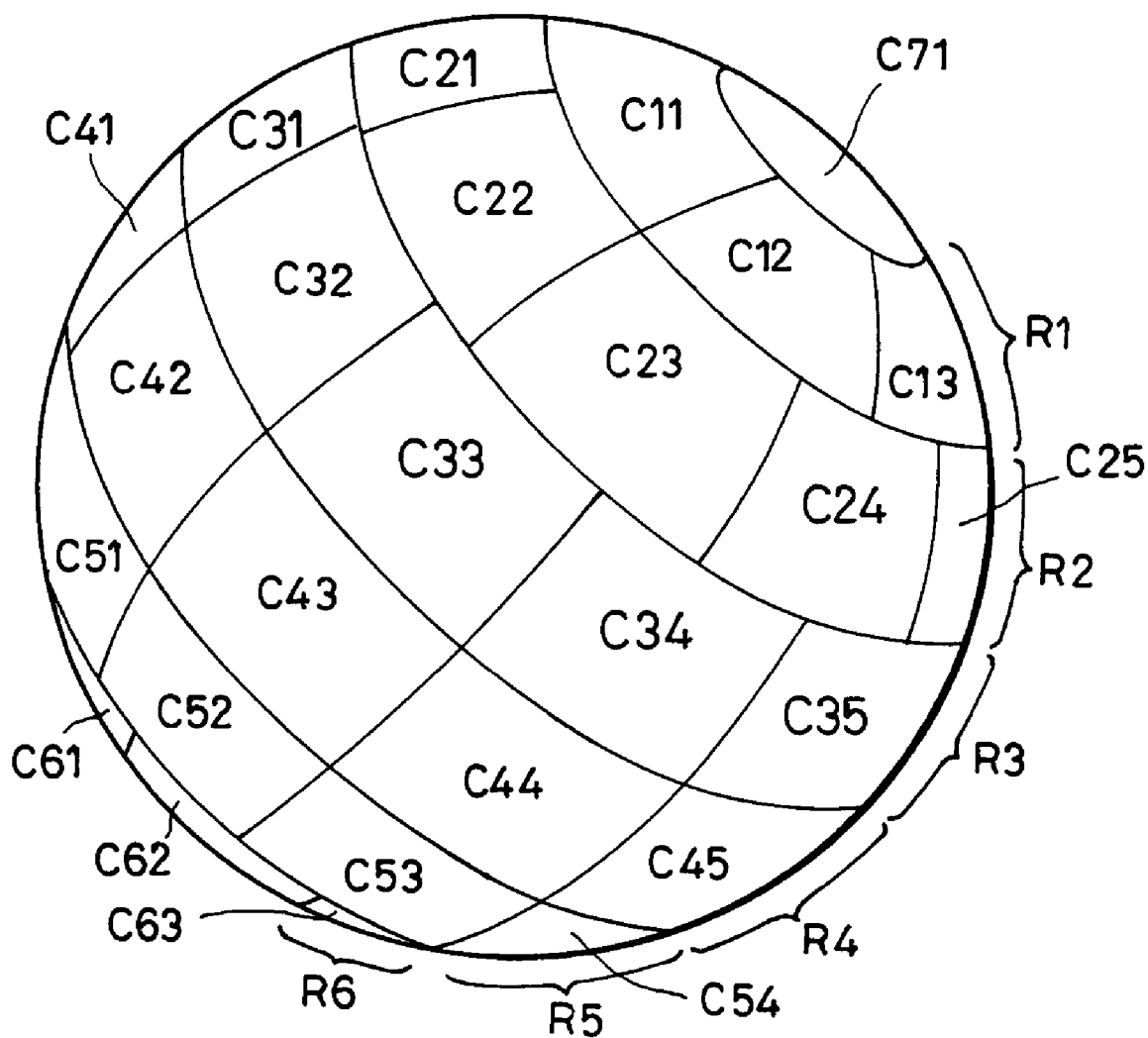
FIG. 3 is a schematic construction diagram (perspective view) of an image pickup apparatus according to another embodiment of the present invention.

Subsequently, FIG. 3 is a schematic construction diagram (perspective view) of an image pickup apparatus according to another embodiment of the present invention.

As shown in FIG. 3, 6 camera rows R1 to R6, in total, of a first camera row R1 composed of cameras (image pickup units) C11, C12, C13, . . . , a second camera row R2 composed of cameras (image pickup units) C21, C22, C23, C24, C25, . . . , a third camera row R3 composed of cameras (image pickup units) C31, C32, C33, C34, C35, . . . , a fourth camera row R4 composed of cameras (image pickup units) C41, C42, C43, C44, C45, . . . , a fifth camera row R5 composed of cameras (image pickup units) C51, C52, C53, C54, . . . , and a sixth camera row R6 composed of cameras (image pickup units) C61, C62, C63 . . . , are accumulated to constitute a spherical image pickup apparatus 100.

Also, in this image pickup apparatus 100, another camera C71 may be further provided at the polar portion of the sphere. Another camera may be provided at the polar portion of the opposite side of the sphere, although not shown.

Then, in the respective camera rows R1, R2, R3, R4, R5 and R6, the viewpoint centers of several cameras (image pickup units) comprising the camera row may be located within the sphere with the diameter of at least 20 mm, more preferably, those viewpoint centers should be made substantially coincident with each other. The viewpoint centers of the respective cameras (image pickup units) are defined similarly to the aforementioned embodiment.

The respective cameras should be located in such a manner that all of the viewpoint centers of the cameras (image pickup units) of the respective camera rows R1, R2, R3, R4, R5 and R6 may be located near the center of the sphere of the image pickup apparatus 100 rather than near the centers of the belt-like camera rows R1, R2, R3, R4, R5 and R6 in order to join images of the upper and lower camera rows without parallax.

More preferably, the viewpoint centers of all cameras (image pickup units) should be made substantially coincident with the center of the sphere of the image pickup apparatus 100.

While D assumed the cross-section length of the horizontal direction of the front lens 2 and A assumes the cross-section length (length of one side) of the horizontal direction of the image pickup device 3 in the preceding embodiment, according to the present invention, the respective image pickup areas of the adjacent image pickup units may overlap each other in a certain direction, and D and A may be defined as the cross-section lengths in such direction.

Accordingly, in the image pickup apparatus 100 according to this embodiment, since the respective image pickup areas of the adjacent image pickup units within the same camera row overlap each other, when D assumes a cross-section length Dx of the horizontal direction of the front lens and A assumes a cross-section length (length of side of horizontal direction) Ax of the horizontal direction of the image pickup device, the image pickup apparatus is constructed in such a manner that these cross-section lengths may satisfy the conditional equation (1).

That is, the image pickup apparatus is constructed so as to satisfy the following equation (1X):

$$AxL < fDx \quad (1X).$$

Further, in order to overlap the image pickup areas of the image pickup units of the camera rows accumulated in the upper and lower direction, that is, the image pickup areas of the upper and lower image pickup units each other, further, when D assumes a cross-section length Dy of the upper and lower direction of the front lens and A assumes a cross-section length (=length of side of upper and lower direction) Ay of the upper and lower direction of the image pickup device, the image pickup apparatus is constructed in such a manner that these cross-section lengths may satisfy the conditional equation (1).

That is, the image pickup apparatus is constructed so as to satisfy the following equation (1Y):

$$AyL < fDy \quad (1Y).$$

When the flat surface shape of the image pickup device is square, Ax=Ay is established.

The length L is constant regardless of the direction.

Astigmatism may be prevented from being produced by using a lens (spherical lens, etc.) whose focal length f becomes constant regardless of the direction as the front lens or the intermediate lens group.

According to the above-mentioned image pickup apparatus 100 of this embodiment, since the image pickup apparatus is constructed so as to satisfy the conditional equation (1) in the direction in which the cameras (image pickup units) may overlap each other, the viewpoint centers of the respective cameras (image pickup units) are located behind the image pickup devices so that it becomes possible to locate the viewpoint centers of several cameras of respective camera rows or the viewpoint centers of all cameras within the sphere with the diameter of 20 mm, more preferably, it becomes possible to make the viewpoint centers become substantially coincident with each other.

As a result, similarly to the image pickup apparatus 20 according to the preceding embodiment, no parallax occurs so that images at the joints need not be processed when images shot by the respective image pickup units 1 are joined and image quality can be maintained to be high. Also, a processing time for joining images can be omitted or reduced.

Accordingly, processing for overlapping images can be executed in a real-time fashion and it is possible to apply the present invention to a live broadcast and the like with ease.

Then, since the image pickup apparatus 100 according to this embodiment does not use a mirror, a cameraman is not troubled by a mirror which is difficult to handle, and hence, the image pickup apparatus according to the present invention can be made easy to handle similarly to an ordinary lens. In addition, as compared with the case in which the image pickup apparatus uses a mirror, the image pickup apparatus 100 can be miniaturized.

Also, when a cameraman intends to take a picture of an object in the shortest range from the image pickup apparatus 100 according to this embodiment, the dead angle is not produced and hence the image pickup apparatus according to the present invention can take pictures of any objects.

Further, when the image pickup apparatus 100 according to this embodiment is compared with another arrangement of an image pickup apparatus for taking pictures in all directions, for example, an arrangement using a fisheye lens and a single camera or an arrangement using a curved surface mirror and a single camera, it is possible to maintain much more picture elements, since the image pickup areas can be overlapped with each other by using a plurality of image pickup units C11 to C71.

Since much more picture elements can be maintained as described above, it becomes possible to improve resolution and also it becomes possible to improve image quality.

Also, since the image pickup area of one image pickup unit 1 is narrowed and a range in which lenses for use with the image pickup unit are selected can be widened so that it becomes possible to use a lens having high optical performance, it becomes possible to obtain sufficient resolution and image quality by maintaining resolution near the joint of the image pickup areas of the respective image pickup units.

Accordingly, it is possible to shoot pictures of high image quality in all directions.

Further, according to the image pickup apparatus 100 of this embodiment, since 6 rows of the camera rows R1, R2, R3, R4, R5 and R6 in which several cameras (image pickup units) are arrayed in a belt-like fashion are accumulated, it becomes possible to take pictures in all directions containing upper and lower directions at the same time.

While a plurality of image pickup units is disposed around the central axis of the image pickup apparatus 20 and 100 in a radial fashion and this central axis is extended in the vertical direction in the above-mentioned respective embodiments, the present invention is not limited thereto and this central axis may be extended in the horizontal direction and other directions.

Further, while a plurality of image pickup units can take pictures of 360 degrees of the belt-like area, that is, pictures of the whole circumference in the above-mentioned respective embodiments, the present invention is not limited thereto and a plurality of image pickup units may take pictures of a part (for example, 120 degrees, 180 degrees, 240 degrees and the like) of the whole circumference.

Also, the shape of the image pickup area of each image pickup unit is not limited to a substantially quadrangular shape and other shapes such as a hexagonal shape and a pentagonal shape like a soccer ball are also possible.

Regardless of the shape of the image pickup area of each image pickup unit, in the respective directions of the direction (one direction or a plurality of directions) in which the image pickup areas of the adjacent image pickup units overlap each other, the cross-section length A of the image pickup device and the front lens D obtained when the cross-section passing the viewpoint center, the image pickup device and the front lens is created may satisfy the conditional equation (1).

The present invention is not limited to the above-mentioned embodiments and can take various arrangements without departing from the gist of the present invention.

According to the above-mentioned image pickup apparatus of the present invention, no parallax occurs so that images at the joints need not be processed when images shot by the respective image pickup units 1 are joined and image quality can be maintained to be high. Also, a processing time for joining images can be omitted or reduced.

Accordingly, processing for overlapping images can be executed in a real-time fashion and it is possible to apply the present invention to a live broadcast and the like with ease.

Also, since the image pickup apparatus according to the present invention does not use a mirror, a cameraman is not troubled by a mirror which is difficult to handle and hence the image pickup apparatus according to the present invention can be made easy to handle similarly to the ordinary lens. In addition, the image pickup apparatus can be miniaturized.

Further, when a cameraman intends to take a picture of an object in the shortest range, the dead angle is not produced and hence the image pickup apparatus according to the present invention can take pictures of any objects.

Further, according to the image pickup apparatus of the present invention, since images of a plurality of image pickup units can be joined and much more picture elements can be maintained, it becomes possible to improve resolution and image quality.

Also, since the image pickup area of one image pickup unit is narrowed and a range in which lenses for use with the image pickup unit are selected can be widened so that it becomes possible to use a lens having high optical performance, it becomes possible to obtain sufficient resolution and image quality by maintaining resolution near the joint of the image pickup areas of the respective image pickup units.

Accordingly, it is possible to shoot pictures of high image quality in a wide range such as a whole circumference or all directions.

The invention claimed is:

1. An image pickup apparatus capable of shooting a picture in a wide range comprising a plurality of adjacent image pickup units,
wherein the fields of view of adjacent image pickup units within the image pickup apparatus overlap each other;
wherein each image pickup unit comprises:
a front lens;
a lens group; and
an image pickup device;
wherein the lens group is positioned between the front lens and the image pickup device;
wherein, within each image pickup unit, if a point at which a principal ray at an end of an angle of view is extended to cross an optical axis is defined as a viewpoint center, the front lens, the lens group, and the image pickup device are arranged such that the viewpoint center is located behind the image pickup device;
wherein, if a cross-section of the image pickup unit extends down an optical axis of the image pickup unit, each of the image pickup units satisfy a conditional equation $AL<fD$, where:
A is a cross-sectional length of the image pickup device within the cross-section;
L is a cross-sectional length from the front lens to the image pickup device within the cross-section;
f is a whole focal length of a lens system comprising the front lens and the lens group; and
D is a cross-sectional length of the front lens within the cross-section; and
wherein the viewpoint centers of the plurality of image pickup units lie within a sphere with a diameter of 20 mm.

2. An image pickup apparatus according to claim 1, wherein the fields of view of adjacent image pickup units within the image pickup apparatus overlap each other in a plurality of directions and the image pickup units satisfy the conditional equation in all of the plurality of directions.

3. An image pickup apparatus according to claim 1, wherein a first front lens of a first image pickup unit and a second front lens of a second image pickup unit adjacent to the first image pickup unit are shaped following a cross-section passing through the viewpoint center and a principle ray at the end of an angle of view.

* * * * *